3,278,480
SULFOCHLORINATED HYDROCARBON POLY-
MERS AS CURE ACCELERATORS FOR SULFUR
CURABLE ETHYLENE-PROPYLENE TERPOLY-
MER RUBBERS
Robert Ricketts Radcliff and Melvin Albert Schoenbeck,
Wilmington, Del., assignors to E. I. du Pont de Nemours
and Company, Wilmington, Del., a corporation of Delaware
No Drawing. Filed Nov. 15, 1962, Ser. No. 238,004
9 Claims. (Cl. 260—41)

This invention relates to sulfur-curable, filler-loaded elastomeric compositions. More particularly, it relates to such compositions wherein the principal elastomer present therein is an α-olefin copolymer. Still more particularly, it relates to sulfur-cured, filler-loaded elastomers and methods for their preparation.

Sulfur-curable α-olefin hydrocarbon copolymers are acquiring increasing importance today in the manufacture of a wide variety of useful products. For some applications it is desirable that a large proportion of a filler, e.g., a reinforcing kaolin clay, calcined kaolin clay or carbon black filler be present along with the α-olefin copolymer. Although such compositions can be cured by numerous sulfur-curing systems, the vulcanizates obtained may require improved electrical properties, a higher modulus or lower compression sets for the contemplated uses. For applications such as vent window seals and molded corners on windshield gaskets, it is desirable that a large proportion of a reinforcing carbon black be used to extend the α-olefin copolymer; however, the compression sets at 100° C. of the vulcanizates obtained with the usual sulfur-curing systems have left something to be desired. It is known that improved results can be attained, to some extent, if these filled stocks are specially heat-treated prior to incorporation of the curing agent, and it has also been found that this heat-treatment is made more effective if certain promoters are present during the heat-treatment such as the dinitroso, dioxime, and aromatic quinoid compounds. It may be, however, quite inconvenient and expensive to carry out the heat-treatment process, since the extra time required to cool the heat-treated stocks before the curing agents can be added lowers the production rate.

It is, therefore, an object of the present invention to provide novel loaded hydrocarbon compositions displaying improved curability. It is a further object to provide novel sulfur-cured, filler-loaded α-olefin copolymer compositions and methods for their preparation. Another object is to provide such compositions which display improved modulus and a lower compression set. Yet another object is to provide such compositions by a process which obviates the necessity for an intervening heat treatment step. Other objects will appear hereinafter.

These and other objects are accomplished in accordance with this invention by a process for preparing a sulfur-cured, filler-loaded elastomeric composition which comprises mixing (I) a normally solid elastomeric copolymer of at least one α-monoolefin and at least one non-conjugated hydrocarbon diene, said elastomeric copolymer having up to about 2 gram-moles of carbon-to-carbon double bonds per kilogram, (II) from about 20 to 300 parts of a filler compound per 100 parts of copolymer, (III) a sulfochlorinated saturated aliphatic hydrocarbon polymer containing at least about 20% by weight chlorine and at least about 0.4% by weight sulfur chemically incorporated therein; and (IV) a sulfur-curing system in amounts containing sufficient sulfur to react with said copolymer and heating the mixture to effect a cure.

The principal elastomer is a normally solid elastomeric copolymer of at least one α-monoolefin and at least one non-conjugated hydrocarbon diene.

The α-monoolefins have the structure R—CH=CH$_2$, wherein R is H or C$_1$–C$_{16}$ alkyl. Representative examples of useful α-monoolefins include: propylene; 1-butene; 4-methyl-1-pentene; 1-pentene; 1-hexene; 1-heptene; 1-octene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene; 4,4-dimethyl-1-hexene; 5,6,6-trimethyl-1-heptene; 1-dodecene; and 1-octadecene. The straight chain olefins are preferred.

Representative dienes include open-chain compounds of the formula

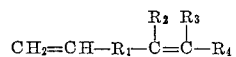

wherein R$_1$ is an alkylene radical, R$_2$ and R$_3$ are independently selected from the group consisting of hydrogen and alkyl radicals, and R$_4$ is an alkyl radical and wherein R$_1$ to R$_4$ are so selected that the diene has from about 6 to 22 carbon atoms. Examples of these dienes include: 1,4-hexadiene; 1,9-octadecadiene; 6-methyl-1,5-heptadiene; 7-methyl-1,6-octadiene; 11-ethyl-1,11-tridecadiene; 9-ethyl-1,9-undecadiene; 7-ethyl-1,7-nonadiene; 8-propyl-1,8-undecadiene; 8-ethyl-1,8-decadiene; 10-ethyl-1,9-dodecadiene; 12-ethyl-1,12-tetradecadiene; 13-n-butyl-1,12-heptadecadiene; and 15-ethyl-1,15-heptadecadiene. Open-chain dienes having two terminal non-conjugated carbon-to-carbon double bonds, e.g., 1,5-hexadiene and 1,4-pentadiene can be used but are less preferred. Representative cyclic non-conjugated dienes include: dicyclopentadiene; 5-alkenyl-substituted-2-norbornenes; 5-methylene-2-norbornene; 2-alkyl-2,5-norbornadienes.

Representative examples of copolymers made from these α-monoolefins and the above-described non-conjugated dienes and their preparation are described in U.S. Patents 2,933,480 and 3,000,866; in French Patents 1,285,-090 and 1,302,690; and in assignee's U.S. application of Gladding and Nyce, Serial No. 73,994, filed December 6, 1960. Particularly preferred are copolymers of from about 30 to 70 weight percent ethylene, 30 to 70 weight percent propylene and up to about 10 weight percent 1,4-hexadiene or dicyclopentadiene. As previously stated, these copolymers have up to about 2 gram-moles of carbon-to-carbon double bonds per kilogram.

These α-olefin copolymers can be oil extended before they are cured by the present invention. Copolymers having Mooney (ML–4/100° C.) viscosities of at least 50, preferably higher, and inherent viscosities of 1.8 or above (measured on a 0.1% solution by weight in tetrachloroethylene at 30° C.) have been found to be suitable. The oils used are petroleum oils having a flash point of at least about 300° F. and a viscosity-gravity constant in the range of from 0.80 to 1.0, preferably 0.80 to 0.90. The particularly preferred oils have a total nitrogen base and first acidaffin content of not greater than 15% by weight as determined by the Rostler method, described in Industrial and Engineering Chemistry, vol. 41, pages 598–608, March 1949. The viscosity-gravity constant is described in the 1958 booklet "A Graphic Method for Selecting Oils Used in Compounding and Extending Butadiene-Styrene Rubbers" (Industrial Products Department, Sun Oil Company, Philadelphia, Pennsylvania, 1958). Representative oils include paraffinic oils, naphthenic, relatively aromatic, and aromatic oils. The petroleum oil can be introduced into the copolymer any time after the polymerization reaction is finished. The petroleum oil can be added to the solution, the resulting mixture obtained being pumped to a drum dryer to remove the solvent. Alternatively, the petroleum oil can be introduced at the nip of the drum dryer along with the polymer solution. If desired, petroleum oil can be introduced into the dried copolymer stock in a Banbury mixer or on a rubber roll mill. A good dispersion can readily be obtained by empirical experimentation by those skilled in the art. A detailed view of the major petroleum oils is given in the article entitled "Hydrocarbon Composition of Rubber Process Oils" by S. Kurtz, Jr., and C. C. Martin, India Rubber World Co., 126, No. 4, July 1952, page 495 onward.

A wide variety of fillers can be employed. Representative examples include: calcined kaolin clay, blanc fixe, titanium dioxide, magnesium silicate, esterified silica, kaolin clays, fine particle talc whiting, and carbon blacks. The filler compound used in the present invention is preferably a kaolin clay, a calcined kaolin clay, or carbon black.

Any kaolin clay which is conventionally used for reinforcing elastomers can be employed to make the mixtures of the present invention. In general, these clays have particle sizes in the range of 2 microns. The finer the particle size, the better the filler responds in giving an improved vulcanizate. It is not critical whether these kaolin clays are "residual" or "sedimentary" in origin; they can be produced by any conventional process such as the dry process (air floatation) or the wet process (classification in a water suspension). These clays are the clay minerals belonging to the kaolin group and have a stable non-expanding crystal lattice in which one gibbsite sheet is condensed with one silica sheet. Representative minerals include kaolinite, the most important one, nacrite, dickite, and halloysite. Kaolinite has the chemical formula $Al_2O_3 \cdot 2SiO_2 \cdot 2H_2O$. It is to be understood that these kaolins generally also contain some compounds of iron, titanium, calcium, magnesium, potassium, sodium, and occasionally manganese; in kaolinites minor proportions of hydrated aluminum silicate minerals other than kaolinite may be present. In general, the molar ratio of silica to alumina in the clay is in the neighborhood of 2:1, the value of kaolinite itself.

The principal physical characteristics of a kaolin clay which are preferred for use in the present invention are: (1) a specific gravity of about 2.60; (2) a 325-mesh screen residue below about 3.5%, preferably below about 0.35%; (3) absorbed moisture content not above about 0 to 1%; (4) a particle size distribution wherein at least about 55% by weight of the particles are two microns or less in diameter; and (5) a pH (in water) of about 4.4 to 7.0, although specially prepared and treated clays may show pH values of 8.0 or higher.

Representative "hard" and "soft" kaolins contain (by weight): 44 to 46% silica; 37.5 to 39.5% alumina; 0.5 to 2.0% iron oxide; and 1 to 2% titanium dioxide; the ignition loss of these representative clays is 13.9 to 14.0% by weight. Calcined kaolins can also be used, as mentioned above. Clays are more particularly described in the following publications: Compounding Ingredients for Rubber, third edition, 1961, Cuneo Press of New England, Cambridge, Mass., compiled by the editors of Rubber World, 630 Third Avenue, New York 17, New York; Kaolin Clays and Their Industrial Uses, J. M. Huber Corp., New York, New York, second edition, 1955; India Rubber World, vol. 118, No. 6, New York, September 1948, pages 793–795; Clays, Their Occurrence, Properties and Uses, H. Ries, third edition, John Wiley & Sons, Inc., New York, 1927; The Chemistry and Physics of Clays and Other Ceramic Materials, A. B. Searle and R. W. Grimshaw, third edition, Interscience Publishers, Inc., New York, 1959; Preliminary Reports Reference Clay Materials, American Petroleum Institute Research Project 49, Columbia University, New York, January 1951, and X-Ray Identification and Crystal Structures of Clay Materials, edited by G. W. Brindley, London, 1951.

When carbon black is to be used channel and furnace process blacks are preferred. Stocks containing the former filler are slightly slower curing. Thus any of the channel blacks such as EPC, MPC, HPC, CC can be used. SAF furnace black is an excellent reinforcing agent; other furnace blacks such as SRF, HMF, CF, HAF, and FF can also be satisfactorily used. Thermal carbons can be employed but provide a lower order of reinforcement.

About 20 to 300 parts of filler are used per 100 parts of copolymer. When carbon black is used the amounts are frequently from 40 to 80 parts; when kaolin clay is the filler the amounts are frequently in the range of 80 to 120 parts.

The promoter is a sulfochlorinated saturated aliphatic hydrocarbon polymer having at least 20% chlorine and at least 0.4% sulfur by weight. Representative preferred polymers contain about 25 to 50% chlorine and about 0.9 to 3% sulfur by weight. The sulfochlorinated saturated aliphatic hydrocarbon polymers are prepared by reacting saturated hydrocarbon polymers with a mixture of chlorine and sulfur dioxide (as described in U.S. Patent 2,212,786 of McQueen). Representative sulfochlorinated polymers include: sulfochlorinated polymers containing 25 to 37% chlorine and 0.4 to 3% by weight sulfur made from polyethylene (U.S. Patent 2,586,363 to McAlevy); sulfochlorinated polymers containing 20 to 45% chlorine and 0.4 to 3% sulfur by weight made from hydrogenated homopolymers of conjugated hydrocarbon dienes; hydrogenated interpolymers of at least two conjugated hydrocarbon dienes; or hydrogenated interpolymers of at least two $C_2$–$C_6$ α-olefins containing 20 to 35% chlorine and 0.5 to 3% sulfur by weight (U.S. Patent No. 2,879,251 of Johnson and Smook); sulfochlorinated polyethylene having 38 to 48% chlorine, and 0.5 to 3% sulfur by weight, the polyethylene prior to sulfochlorination having a density from 0.95 to about 0.960, a melt index of from about 0.2 to about 200 and a solubility in carbon tetrachloride of at least 1% by weight (U.S. Patent No. 2,982,759 of Heuse). Representative preferred sulfochlorinated polyethylenes include: sulfochlorinated polyethylene containing 1.5% sulfur and 30% chlorine by weight, the polyethylene before sulfochlorination having a density of 0.912 and a melt index of 10; a sulfochlorinated polyethylene containing 1.6% sulfur and 24% chlorine by weight, the polyethylene before sulfochlorination having a density of 0.922 and a melt index of 100; a sulfochlorinated polyethylene containing 0.97% sulfur and 35.4% chlorine by weight and having a specific gravity of 1.18, the polyethylene before sulfochlorination having a density of 0.96 and a melt index of about 0.5; a sulfochlorinated polyethylene containing 1.0% sulfur and 26.5% chlorine by weight, the polyethylene before sulfochlorination having a density of 0.960 and a melt index of 0.7.

In general about 1 to 10 parts of the sulfochlorinated polymer are employed for every 100 parts by weight of the sulfo-curable elastomer; the preferred range is about 2 to 5 parts. It is to be understood that more than 10 parts can be employed but there is generally no need for a larger concentration; an overly large concentration of the sulfochlorinated polymer may be incompatible with the elastomer. For example, compositions containing more than 50% by weight of sulfochlorinated polyethylene would not normally be used. When less than 1 part of the sulfochlorinated polymer is employed for every 100 parts of the sulfur-curable polymer, the desired improvement in vulcanizate properties, e.g., modulus and compression set, tend to fall off.

In operating the present invention, all the components of the curable composition of this invention must be present before curing begins. The order of addition is not important. Mixing of the components of the curable composition is carried out in the conventional manner using rubber roll mills, Banbury mixers, and the like. In order to avoid premature scorch, it is preferred to mix at temperatures in the range 75 to 100° F., well below the cure temperature. Since the sulfochlorinated polymer tends to decrease Mooney scorch time, it is particularly useful to add the sulfochlorinated polymer ahead of the sulfur curing system.

The compositions of the present invention can be very readily cured with sulfur to give outstanding vulcanizates. Any of the procedures familiar to those skilled in the processing of natural rubber, butadiene/styrene rubber and butyl rubber are suitable. It is preferable to use a combination of sulfur, a metal oxide, and a vulcanization accelerator. In general, about 0.2 to 3.5 parts of sulfur are used per 100 parts by weight of copolymer; it is to be understood that larger or smaller concentrations may be used when deemed desirable. Zinc oxide and cadmium oxide are the preferred oxides; zinc oxide is particularly preferred because it is more efficient, lower in cost, and is less hazardous to use. The concentration of the metal oxide is important since it, in conjunction with sulfur and accelerator, controls the ultimate state of cure. At concentrations of 3 to 10 parts by weight of metal oxide per 100 parts by weight of elastomer, the rate and state of cure are very satisfactory as indicated by modulus, compression set, and elongation. Concentrations above 10 parts are unnecessary. Concentrations below 3 parts are less satisfactory for developing and maintaining adequate vulcanizate properties. The most active accelerators include 2-mercaptobenzothiazole, thiuram sulfides, dithiocarbamates and their simple derivatives. Of the three classes, the thiuram sulfides and dithiocarbamates are generally preferred because they produce rapid curing without attendant scorching and develop and maintain maximum physical properties even on extended curing cycles. For many uses, however, 2-mercaptobenzothiazole and its derivatives, alone or in combination with thiurams or dithiocarbamates provide adequate acceleration with processing safety. Representative accelerators include: tetramethyl thiuram monosulfide; tetramethyl thiuram disulfide; tellurium monosulfide; tetramethyl thiuram disulfide; tellurium diethyldithiocarbamate; the zinc salt of dimethyl dithiocarbamic acid; 2-mercaptothiazoline; 2-mercaptothiazole; N,N - diethyl-thiocarbamyl-2-mercaptobenzothiazole; and 2,2'-dithiobis benzothiazole. Unlike natural rubber and styrene-butadiene rubber, the presence of a fatty acid is not necessary for the vulcanization of the α-olefin copolymers. In fact, their vulcanization is inhibited by the presence of relatively weak carboxylic acids if used in excessive amounts. At low concentrations (0.25 to 1.0 part by weight of copolymer), stearic acid is very useful as a release agent for heavily loaded stocks. Vulcanization is accomplished by heating the compounded stock (usually in a mold) at a temperature of about 266° F. (130° C.) to 356° F. (180° C.) for a period ranging from about 5 minutes to several hours; it is often preferred to cure the stock at 320° F. (160° C.) for about 20 to 30 minutes.

Steam cures can be employed as well. Representative pressures can range from 60 to 225 lbs./sq. in. steam and representative times can range from about 30 seconds to 30 minutes. The preferred steam cure is about 30 seconds at 225 lbs./sq. in. steam pressure. The state of cure is best determined by extension modulus at 300% elongation.

It is to be understood that various modifications of the sulfur curing procedure may be employed depending upon the stock. Various procedures and modifications of sulfur curing are more particularly described in Encyclopedia of Chemical Technology, Kirk and Othmer, published by Interscience Encyclopedia, Inc., New York, 1953, 11, pp. 892–927; Principles of High-Polymer Theory and Practice, Schmidt and Marlies, published by McGraw-Hill Book Co., New York, 1948, pp. 556–566; Chemistry and Technology of Rubber, Davis and Blake, published by Reinhold Publishing Corp., New York, 1937, chapter 6; Introduction to Rubber Technology, edited by M. Morton, Reinhold Publishing Corp., New York, 1959, pp. 93–129; The Applied Science of Rubber, edited by W. J. S. Naunton, Edward Arnold Ltd., London, 1961, pp. 346–413, 992–1099.

The invention will now be described in and by the following examples of certain preferred embodiments wherein parts and percentages are by weight unless otherwise specified.

*Example I*

A sulfur-curable ethylene hydrocarbon copolymer is prepared in accordance with the general directions described in U.S. Patent 2,933,480, consisting of the following monomer units by weight: 48.9% ethylene, 47.8% propylene, and 3.3% 1,4-hexadiene. The copolymer exhibits a Mooney (ML–4/100° C.) of 82 to 104.

A sulfochlorinated polyethylene is made in accordance with U.S. Patent No. 2,586,363 containing 1.0% sulfur and 26.5% chlorine by weight; the polyethylene before sulfochlorination has a density of 0.960 and a melt index of 0.7.

Four stocks are compounded on a rubber roll mill at a temperature between 75 and 100° F. according to the following general recipe.

| Component: | Parts by weight |
|---|---|
| Ethylene/propylene/1,4-hexadiene copolymer | See table below. |
| Sulfochlorinated polyethylene | See table below. |
| Stearic acid | 1. |
| Zinc oxide | 5. |
| HAF carbon black | 50. |
| Petroleum oil ("Necton 60") [1] | 20. |
| Sulfur | 2.5. |
| Zinc dimethyl dithiocarbamate | 2.5. |
| 2-mercaptobenzothiazole | 0.5. |

[1] Flash point 445° F. Sum of N-bases and first acidaffins 1.5%; second acidaffins 28.3%; paraffins 70.2%; viscosity-gravity constant 0.834.

The stocks when cured for 20 and 30 minutes at 320° F. in a press, give vulcanizates having the following representative properties at 25° C.:

| | Ia | Ib | Ic | Id |
|---|---|---|---|---|
| Ethylene/propylene/1,4-hexadiene copolymer | 98 | 95 | 90 | 100 |
| Sulfochlorinated polyethylene | 2 | 5 | 10 | 0 |
| Cure—20 min./320° F.: | | | | |
| 300% Modulus, p.s.i | 1,600 | 1,720 | 1,930 | 1,420 |
| Tensile Strength, p.s.i | 2,500 | 2,700 | 2,400 | 2,700 |
| Elongation at break, percent | 430 | 390 | 360 | 450 |
| Cure—30 min./320° F.: | | | | |
| 300% modulus, p.s.i | 1,830 | 2,050 | 2,120 | 1,820 |
| Tensile strength, p.s.i | 2,620 | 2,220 | 2,300 | 2,700 |
| Elongation at break, percent | 380 | 340 | 330 | 390 |

From the above data it appears that the modulus of stocks prepared in accordance with this invention (Ia–c) is improved over stock Id containing no promoter composition.

*Example II*

Example I is essentially repeated except that the carbon black is replaced by an air-floated "hard" kaolin clap (commercially available from the J. M. Huber Corp. New York, New York, as "Suprex" clay) containing 44 to 45% silica, 37.5 to 30.5% alumina, 1.5 to 2.0% iron oxide, and 1 to 2% titanium dioxide by weight, the ignition loss being 13.9 to 14.2% by weight. The maximum moisture content is 1% by weight and the pH (in water) is 4.5 to 5.5. This clay has a specific gravity of 2.60, a 325-mesh screen residue of 0.17% by weight and the following particle size distribution (by weight): greater than 10 microns, 0.1%; 5 to 10 microns, 2.8%; 4 to 5 microns, 1.5%; 3 to 4 microns, 2.3%; 2 to 3 microns, 3.5%; 1 to 2 microns, 9.0%; 0.5 to 1.0 micron, 19.0%; and 0 to 0.5 micron, 61.9%.

Four stocks are compounded on a rubber roll mill at a temperature between 75 to 100° F. according to the following general recipe.

| Component: | Parts by weight |
| --- | --- |
| Ethylene/propylene/1,4-hexadiene copolymer | See table below. |
| Sulfochlorinated polyethylene | See table below. |
| Kaolin clay | 120. |
| Petroleum oil of Ex. I | 20. |
| Zinc oxide | 5. |
| Sulfur | 2.5. |
| Zinc dimethyl dithiocarbamate | 2.5. |
| 2-mercaptobenzothiazole | 0.5. |

The stocks thereby obtained are cured for 10, 20, and 30 minutes in a press at 320° F. The scorch behavior and the vulcanizate properties at 25° C. recorded in the table below are representative:

|  | IIa | IIb | IIc | IId |
| --- | --- | --- | --- | --- |
| Ethylene/propylene/1,4-hexadiene copolymer | 98 | 95 | 90 | 100 |
| Sulfochlorinated polyethylene | 2 | 5 | 10 | 0 |
| Mooney Scorch: |  |  |  |  |
| Minimum | 43 | 40 | 39 | 43 |
| Min. to 10 pt. rise | 12 | 15 | 18 | 9 |
| Cure—10 min./320° F.: |  |  |  |  |
| 300% Modulus, p.s.i | 750 | 930 | 1,030 | 400 |
| Tensile strength, p.s.i | 1,850 | 1,650 | 1,520 | 2,000 |
| Elongation at break, percent | 720 | 630 | 560 | 850 |
| Cure—20 min./320° F.: |  |  |  |  |
| 300% Modulus, p.s.i | 880 | 1,120 | 1,150 | 540 |
| Tensile strength, p.s.i | 1,800 | 1,630 | 1,620 | 1,800 |
| Elongation at break, percent | 630 | 500 | 520 | 690 |
| Cure—30 min./320° F.: |  |  |  |  |
| 300% Modulus, p.s.i | 950 | 1,170 | 1,170 | 620 |
| Tensile strength, p.s.i | 1,400 | 1,450 | 1,530 | 1,700 |
| Elongation at break, percent | 490 | 410 | 460 | 650 |

The results indicate that the modulus of stocks prepared in accordance with the invention (IIa–c) are greatly improved over stock IId containing no promoter.

*Example III*

Example I is essentially repeated except as indicated herein. The carbon black filler is replaced by a calcined kaolin clay ("Iceberg pigment," commercially available from the Burgess Pigment Co.) containing 45–52% silica and 38 to 44% alumina and having an ignition loss of 0%. It has a specific gravity of 2.63 and a pH (in water) of 6.0. The 325-mesh screen residue is 0.5% by weight. About 65% of the clay particles by weight are $2\mu$ or smaller in size.

Two stocks are compounded on a rubber roll mill at a temperature between 75 and 100° F. according to the following general recipe.

| Component: | Parts by weight |
| --- | --- |
| Ethylene/propylene/1,4-hexadiene copolymer | See table below. |
| Sulfochlorinated polyethylene | See table below. |
| Calcined clay | 120. |
| Petroleum oil of Ex. I | 40. |
| Zinc oxide | 5. |
| Sulfur | 3. |
| Zinc dimethyl dithiocarbamate | 2.5. |
| 2-mercaptobenzothiazole | 0.5. |

These stocks are then cured for 5, 10 and 20 minutes at 320° F. The Mooney scorch behavior and the vulcanizate properties (at 25° C.) given in the table below are representative:

|  | IIIa | IIIb |
| --- | --- | --- |
| Ethylene/propylene/1,4-hexadiene copolymer | 95 | 100 |
| Sulfochlorinated polyethylene | 5 | 0 |
| Mooney Scorch: |  |  |
| Minimum | 23 | 26 |
| Min. to 10 pt. rise | 29 | 29 |
| Cure—5 min./320° F.: |  |  |
| 300% Modulus, p.s.i | 560 | 270 |
| Tensile strength, p.s.i | 1,000 | 1,030 |
| Elongation at break, percent | 760 | 870 |
| Compression set, percent | 33 | 41 |
| Cure—10 min./320° F.: |  |  |
| 300% Modulus, p.s.i | 760 | 380 |
| Tensile strength, p.s.i | 1,000 | 1,020 |
| Elongation at break, percent | 500 | 730 |
| Compression set, percent | 16 | 27 |
| Cure—20 min./320° F.: |  |  |
| 300% Modulus, p.s.i | 880 | 470 |
| Tensile strength, p.s.i | 1,050 | 850 |
| Elongation at break, percent | 420 | 570 |
| Compression Set, percent | 13 | 20 |

The modulus of stock IIIa prepared in accordance with the invention is more than twice that of stock IIIb containing no promoter.

*Example IV*

The ethylene/propylene/1,4-hexadiene copolymer employed is made in accordance with the general procedures of U.S. Patent No. 2,933,480 and consists of (by weight): ethylene monomer units, 47.9 to 53.4%; propylene monomer units, 43 to 47%; and 1,4-hexadiene monomer units, 3.6 to 5.1%. It exhibits a Mooney viscosity (ML–4/100° C.) of 85 to 92.

Four sulfochlorinated polyethylene promoters (A, B, C and D) are prepared in accordance with the procedures of U.S. Patents 2,586,363 and 2,862,917 (for D only) identified as follows:

| Promoter | Percent Cl | Percent S | Density [1] | Melt Index [1] |
| --- | --- | --- | --- | --- |
| A | 26.5 | 1.0 | 0.960 | 0.7 |
| B | 30 | 1.5 | 0.912 | 10 |
| C | 44 | 1.6 | 0.922 | 100 |
| D | 35.4 | 0.97 | 0.960 | 0.5 |

[1] Before sulfochlorination.

Five stocks are compounded on a rubber roll mill at a temperature between 75 and 100° F. according to the following general recipe.

| Component: | Parts by weight |
| --- | --- |
| Ethylene/propylene/1,4-hexadiene copolymer | 95 (100 for IVe). |
| Sulfochlorinated polyethylene promoter | 5 (0 for IVe). |
| Kaolin clay of Ex. II | 120. |
| Petroleum oil of Ex. I | 20. |
| Zinc oxide | 2.5. |
| Zinc dimethyl dithiocarbamate | 2.5. |
| 2-mercaptobenzothiazole | 0.5. |
| Sulfur | 2.5. |

The stocks when cured for 10 and 30 minutes at 320° F. in a press, give vulcanizates having the following representative properties at 25° C.:

|  | IVa | IVb | IVc | IVd | IVe |
| --- | --- | --- | --- | --- | --- |
| Promoter Used | A | B | C | D | None |
| Cure—10 min./320° F.: |  |  |  |  |  |
| 300% Modulus, p.s.i | 1,000 | 900 | 800 | 975 | 450 |
| Tensile strength, p.s.i | 1,650 | 1,425 | 1,600 | 1,750 | 2,200 |
| Elongation at Break, percent | 620 | 590 | 710 | 650 | 840 |
| Cure—30 min./320° F.: |  |  |  |  |  |
| 300% Modulus, p.s.i | 1,250 | 1,150 | 1,000 | 1,250 | 625 |
| Tensile strength, p.s.i | 1,800 | 1,500 | 1,600 | 1,750 | 2,275 |
| Elongation at Break, percent | 500 | 450 | 560 | 500 | 680 |

Thus, it is apparent that a wide variety of sulfochlorinated polyethylene promoters can be used to show increased modulus over stock IVe containing no promoter.

In the foregoing examples vulcanizate properties are measured in accordance with the following procedures.

| Property: | ASTM method |
|---|---|
| Stress-strain | D412–51T. |
| Compression set | D395–55, method B. |

The carbon-to-carbon double bond content as used herein is determined as follows: Bromine is allowed to react with a weighed copolymer sample, a potassium iodide solution is added, the excess bromine is determined by treating the liberated iodine with standard sodium thiosulfate. Potassium iodate is added, and the sample is again titrated to fine the extent of substitution.

Twenty-five milliliters of a solution of 5 ml. bromine in one liter of $CCl_4$ is added to a solution of copolymer in 50 ml. of $CCl_4$ at 25° C. The flask is stoppered, covered with a few ml. of 25% aqueous KI, and placed in the dark for two hours at 25° C. Then, the KI solution and about 25 ml. of additional 25% aqueous KI are introduced. The resulting mixture is titrated to a starch end point with 0.1 N sodium thiosulfate. (If it appears that emulsification of the solvent will obscure the end point, 75 ml. of 10% aqueous NaCl are added during the titration.) Then, 5 ml. of aqueous $KIO_3$ (made by dissolving 25 grams $KIO_3$ in one liter of water) are added, and the mixture is again titrated with 0.1 N sodium thiosulfate. A blank is run by repeating the above procedure without the copolymer.

The C=C concentration is determined by subtracting the bromine consumed by substitution in the copolymer from the total bromine consumed by reaction with the copolymer. The total bromine $$\text{Moles/kg.} = \frac{(B-T)0.1}{2 \text{ (grams of copolymer)}}$$

where $B$=ml. 0.1 N sodium thiosulfate used to first end point (before $KIO_3$ addition) of blank solution $T$=ml. 0.1 N sodium thiosulfate used to first end point (before $KIO_3$ addition) of copolymer solution The bromine consumed by substituted moles/kg.=

$$\frac{[(M-H)]0.1}{\text{(grams of copolymer)}}$$

where $M$—ml. 0.1 sodium thiosulfate added after $KIO_3$ solution introduced into copolymer solution $H$=ml. 0.1 sodium thiosulfate added after $KIO_3$ solution introduced into blank solution A distinct advantage of the promoters of the present invention is that they obviate the necessity for carrying out the heat-treatment step when curing stocks containing a kaolin clay or calcined kaolin clay. Results are obtained which are comparable to those gained by the use of heat-treatment in combination with butyl rubber type heat-treatment promoters.

In a similar fashion, the compression set of vulcanizates made from mixtures of this copolymer with carbon black are as good as those of vulcanizates of this copolymer which have undergone a preliminary heat treatment of the black stock with para-quinone dioxime.

The α-olefin compositions of the present invention possess excellent ozone resistance and weatherability (that is, freedom from cracking and crazing) which makes them especially suitable for black stock applications such as hose, windshield blades and the like. The oil extended α-olefin compositions are characterized by exceptionally improved processing behavior which makes them very easy to calender and extrude. The α-olefin compositions loaded with clay can be employed in the preparation of shoe soles and heels and a wide variety of molded articles. The uncured but compounded compositions are not affected by moisture and can be stored for lengthy periods before shaping and vulcanization.

What is claimed is:

1. A process for preparing a sulfur-cured, filler-loaded elastomeric composition which comprises mixing (I) a normally solid elastomeric copolymer of at least one α-monoolefin and at least one non-conjugated hydrocarbon diene, said eleastomeric copolymer having up to about 2 gram-moles of carbon-to-carbon double bonds per kilogram, (II) from about 20 to 300 parts of a filler compound per 100 parts of copolymer, (III) a sulfochlorinated saturated aliphatic hydrocarbon polymer containing at least about 20 weight percent chlorine and at least about 0.4 weight percent sulfur chemically incorporated therein, and (IV) a sulfur-curing system in amounts containing sufficient sulfur to react with said copolymer; and heating the mixture to effect a cure.

2. A process for preparing a sulfur-cured, filler-loaded elastomeric composition which comprises mixing (I) a copolymer of ethylene, propylene and at least one non-conjugated diene of from about 5 to 22 carbon atoms, units of said diene constituting up to about 10 weight percent of said copolymer, (II) from about 20 to 300 parts, per 100 parts of copolymer, of a filler compound selected from the group consisting of carbon black, kaolin clay, and calcined kaolin clay, (III) from 1 to about 10 parts, per 100 parts of copolymer, of a sulfochlorinated saturated aliphatic hydrocarbon polymer containing from about 25 to 50 weight percent chlorine and from about 0.9 to 3 weight percent sulfur chemically incorporated therein, and (IV) a sulfur-curing system in amounts containing sufficient sulfur to react with said copolymer; and heating the mixture to effect a cure.

3. A process as defined in claim 2 wherein said elastomeric copolymer (I) contains from about 30 to 70 weight percent ethylene units, about 30 to 70 weight percent propylene units and up to about 10 weight percent 1,4-hexadiene units.

4. A sulfur-curable, filler-loaded elastomeric composition comprising (I) a normally solid elastomeric copolymer of at least one α-monoolefin and at least one non-conjugated hydrocarbon diene, said elastomeric copolymer having up to about 2 gram-moles of carbon-to-carbon double bonds per kilogram, (II) from about 20 to 300 parts of a filler compound per 100 parts of copolymer, (III) a sulfochlorinated saturated aliphatic hydrocarbon polymer containing at least about 20 weight percent chlorine and at least about 0.4 weight percent sulfur chemically incorporated therein, and (IV) a sulfur-curing systems in amounts containing sufficient sulfur to react with said copolymer.

5. A sulfur-curable, filler-loaded elastomeric composition comprising (I) a copolymer of ethylene, propylene and at least one non-conjugated diene of from about 5 to 22 carbon atoms, units of said diene constituting up to about 10 weight percent of said copolymer, (II) from about 20 to 300 parts, per 100 parts of copolymer, of a filler compound selected from the group consisting of carbon black, kaolin and calcined clay, (III) from 1 to about 10 parts, per 100 parts of copolymer, of a sulfochlorinated saturated aliphatic hydrocarbon polymer containing from about 25 to 50 weight percent chlorine and from about 0.9 to 3 weight percent sulfur chemically incorporated therein, and (IV) a sulfur-curing system in amounts containing sufficient sulfur to react with said copolymer.

6. A composition as defined in claim 5 wherein (I) contains from about 30 to 70 weight percent ethylene units, about 30 to 70 weight percent propylene units and up to about 10 weight percent 1,4-hexadiene units.

7. A sulfur-cured, filler-loaded elastomeric vulcanizate comprising the following components subjected to curing conditions: (I) a normally solid elastomeric copolymer of at least one α-monoolefin and at least one non-conjugated hydrocarbon diene, said elastomeric copolymer having up to about 2 gram-moles of carbon-to-carbon double bonds per kilogram, (II) from about 20 to 300 parts of a filler compound per 100 parts of copolymer, (III) a sulfochlorinated saturated aliphatic hydrocarbon polymer containing at least about 20 weight percent chlorine and at least about 0.4 weight percent sulfur chemically incorporated therein, and (IV) a sulfur-curing system in amounts containing sufficient sulfur to react with said copolymer.

8. A sulfur-cured, filler-loaded elastomeric vulcanizate comprising the following components subjected to curing conditions: (I) a copolymer of ethylene, propylene and at least one non-conjugated diene of from about 5 to 22 carbon atoms, units of said diene constituting about 10 weight percent of said copolymer, (II) from about 20 to 300 parts, per 100 parts of copolymer, of a filler compound selected from the group consisting of carbon black, kaolin clay, and calcined kaolin clay, (III) from 1 to about 10 parts, per 100 parts of copolymer, of a sulfochlorinated saturated hydrocarbon polymer containing from about 25 to 50 weight percent chlorine and from about 0.9 to 3 weight percent sulfur chemically incorporated therein, and (IV) a sulfur-curing system in amounts containing sufficient sulfur to react with said copolymer.

9. A vulcanizate as defined in claim 8 wherein (I) contains from about 30 to 70 weight percent ethylene units, about 30 to 70 weight percent propylene units and up to about 10 weight percent 1,4-hexadiene units.

No references cited.

MORRIS LIEBMAN, *Primary Examiner.*

J. S. WALDRON, *Assistant Examiner.*